United States Patent [19]

Ishii et al.

[11] Patent Number: 5,050,149
[45] Date of Patent: Sep. 17, 1991

[54] SERVO DEVICE FOR DISC PLAYER

[75] Inventors: Hidehiro Ishii; Noriyoshi Takeya; Chiharu Miura; Tatsuya Fukuda, all of Saitama, Japan

[73] Assignee: Pioneer Electronic Corporation, Tokyo, Japan

[21] Appl. No.: 378,937

[22] Filed: Jul. 12, 1989

[30] Foreign Application Priority Data

Oct. 5, 1988 [JP] Japan .................. 63-251223

[51] Int. Cl.$^5$ .............................................. G11B 7/095
[52] U.S. Cl. ........................... 369/43; 369/44.29; 369/44.35; 369/44.36
[58] Field of Search ............ 369/43, 32, 44.28, 44.29, 369/44.32, 44.34, 44.35, 44.36, 27; 358/907, 342

[56] References Cited

U.S. PATENT DOCUMENTS 4,742,505  3/1988  Takeuchi et al. ................ 369/45
4,817,073  3/1989  Suzuki ........................ 369/44.29 X

FOREIGN PATENT DOCUMENTS 95766   12/1983  European Pat. Off. .
220039   4/1987  European Pat. Off. .
0247829 12/1987  European Pat. Off. .
3531579  3/1986  Fed. Rep. of Germany .

Primary Examiner—Roy N. Envall, Jr.
Assistant Examiner—Hung Dang
Attorney, Agent, or Firm—Sughrue, Mion, Zinn, Macpeak & Seas

[57] ABSTRACT

A disc player having digital processing of error signals in a servo system utilizes an A/D converter. The relatively small closed loop error signals are amplified by a predetermined amount above that for the open loop error signals prior to conversion in the A/D converter, and the converter output representing the digitized small error signals are amplified by a predetermined amount below that for the digitized open loop error signals. While the overall gain in the servo system is substantially the same for the closed loop and open loop error signals, the small closed loop error signals are greatly expanded in range at the converter input to permit the same A/D converter to faithfully convert both the open loop and the closed loop error signals.

5 Claims, 2 Drawing Sheets

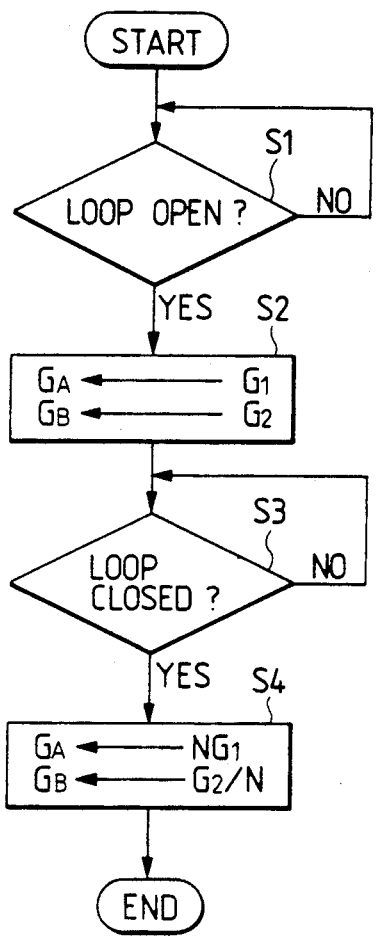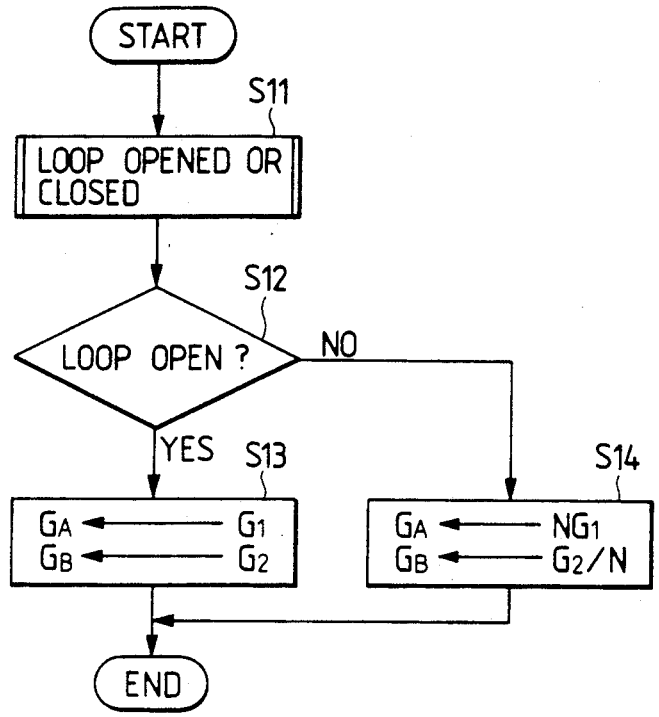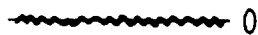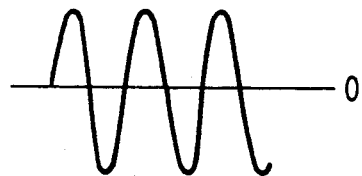

SERVO DEVICE FOR DISC PLAYER

BACKGROUND OF THE INVENTION

This invention relates to a servo device for a disc player.

A disc player for playing data record discs such as video discs and digital audio discs (hereinafter referred to merely as "discs", when applicable) comprises, essentially, a tracking servo system for allowing the data reading spot of the pickup (hereinafter referred to as "a pickup spot", when applicable) to follow the record track whether or not the disc is eccentric and a focus servo system for focusing the pickup spot on the data recorded surface of the disc even when the disc is warped.

Recently, a digital servo has been employed in which an error signal formed according to the output signal of a pickup adapted to read record data from a disc is subjected to A/D (analog-to-digital) conversion so as to be digitally processed.

For instance, in the tracking servo system, when the servo loop is closed, the error components are attributed mainly to the eccentricity of the disc, and therefore the error signal level is small as shown in the part (A) of FIG. 4. When the servo loop is open, as in a search or track jump mode, the pickup spot is moved radially on the disc and the error signal level is much larger than that in the case where the servo loop is closed. The error signal in the open loop condition is shown in the part (B) of FIG. 4.

When error signals of such differing magnitudes are applied to the same A/D converter in a digital servo loop, it becomes clear that the A/D converter will not be effective for the small error signals if set to accommodate the large error signals. For example, if the step size of the converter is selected to accommodate the large range of the open loop error signal, that step size will be much too large to faithfully convert the smaller range error signal when the servo loop is closed.

SUMMARY OF THE INVENTION

Accordingly, an object of this invention is to provide a servo device for a disc player in which the bits of the A/D converter are effectively utilized so that the digital servo can perform with higher accuracy whether the servo loop is open or closed.

The foregoing object of the invention has been achieved by the provision of a servo device for a disc player having an A/D converter for digitizing an error signal formed from an output signal of a pickup adapted to read record data from a data record disc, in which the error signal is digitized, and the pickup is driven according to the level of the error signal thus digitized, which, according to the invention, comprises: a variable gain amplifier provided on the input side of the A/D converter; and control means which increases the gain of the variable gain amplifier by a predetermined value when the servo loop is closed and decreases the gain of a signal processing system on the output side of the A/D converter by the predetermined value.

BRIEF DESCRIPTION OF THE DRAWINGS

FIG. 2 is a flow chart showing one example of a procedure carried out by a processor in a servo controller for controlling the gains of a VCA and a digital equalizer.

FIG. 3 is a flow chart showing another example of the procedure.

FIGS. 4A and 4B are waveform diagrams showing the levels of error signals provided when the tracking servo loop is closed and when it is open. respectively.

DETAILED DESCRIPTION OF THE PREFERRED EMBODIMENTS OF THE INVENTION

Figure 1:
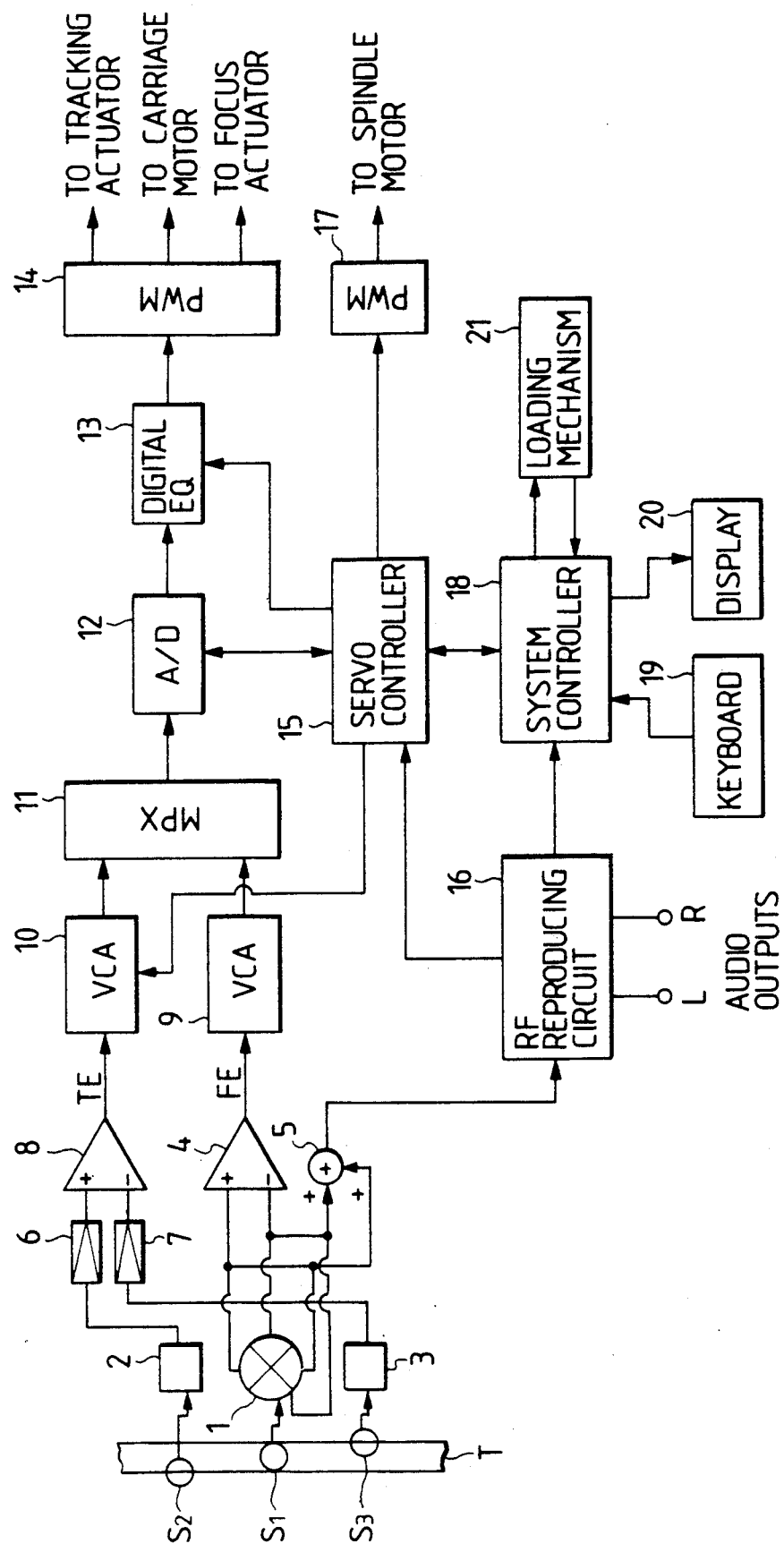
FIG. 1 is a block diagram showing one embodiment of the invention.

FIG. 1 is a block diagram showing an embodiment of the invention. Three beam spots formed by focusing a laser beam include a record data reading spot $S_1$, and a pair of tracking data detecting spots $S_2$ and $S_3$, the tracking data spots are positioned before and after the spot $S_1$. The beam spots move relative to the disc along a recording track T on the disc. As a result, light beams are reflected from the disc, attributed to the beam spots (pickup spots). and applied to photo-electric conversion elements 1, 2 and 3 built in a pickup so that they are converted into electrical signals. respectively. The pickup incorporates an optical system including an objective lens, a focus actuator for controlling the position of the optical axis of the objective lens on the data record surface of the disc, and a tracking actuator for controlling the positions of the pickup spots with respect to the record track T in a radial direction of the disc. The pickup is supported on a carriage (not shown) which is movable radially with respect to the disc.

The photo-electric conversion element 1 comprises four independent light receiving elements which are arranged in such a manner that their light receiving surfaces are defined with two straight lines perpendicular to each other. The sum of the outputs of the two light receiving elements positioned symmetrical with respect to the common center of the light receiving surfaces is applied to one of the input terminals of a differential amplifier 4, and the sum of the outputs of the remaining two light receiving elements positioned symmetrical with respect to the common center is applied to the other input terminal of the amplifier 4, so that the difference signal between the two sums is outputted by the amplifier 4. The difference signal is a focus error (FE) signal. The two sums are further applied to an adder 5 to provide a total sum signal which is the total sum of the outputs of the four light receiving elements. The total sum signal is a reading RF signal. On the other hand, the outputs of the photo-electric conversion elements 2 and 3 are applied respectively through amplifiers 6 and 7 to a differential amplifier 8, so that the difference signal between the two outputs is provided. The difference signal is a tracking error (TE) signal.

The focus error signal and the tracking error signal are applied, respectively, through variable gain amplifiers, namely, voltage-controlled amplifiers (VCAs) 9 and 10, to a multiplexer 11. The multiplexer 11 transmits the focus error signal and the tracking error signal to an A/D (analog-to-digital) converter 12 in a time division mode. The error signals digitized by the A/D converter 12, after being subjected to frequency characteristic compensation by a digital equalizer (EQ) 13, are applied to a PWM (pulse width modulation) circuit 14. so that they are applied, as drive signals having pulse widths corresponding to the magnitudes (levels) of the error signals, to the above-described focus actuator and tracking actuator. In addition, the PWM circuit 14 forms a drive signal having a pulse width corresponding to the level of the output signal of the digital equalizer 13 which subjects the tracking error signal to the extraction of low frequency component and to frequency characteristic compensation. The drive signal is supplied to a carriage motor which is a drive source for the carriage bearing the pickup.

Thus, a digital servo system for converting the error signals into digital signals and processing them in a digital mode has been formed. The servo system is controlled by a servo controller 15 comprising a microcomputer. That is, the servo controller 15 opens and closes each servo loop, and controls the gain of the VCA 10, and the characteristic and gain of the digital EQ (equalizer) 13.

The read RF signal outputted by the adder 5 is applied to an RF reproducing circuit 16. In the case where a disc to be played is a compact disc, the read RF signal is an EFM (eight to fourteen modulation) signal. The EFM signal is subjected to EFM demodulation, to error correction and to D/A (digital-to-analog) conversion by the RF reproducing circuit 16, so that right and left channel audio outputs are provided by the latter. Furthermore, the RF reproducing circuit 16 forms a phase error signal corresponding to the difference in phase of a reproducing clock signal extracted from the read RF signal from the reference clock signal, and obtains sub-code data from EFM demodulation data. The phase error signal is applied through the servo controller 15 to a PWM circuit 17, so that it is supplied, as a drive signal having a pulse width corresponding to an error signal level, to a spindle motor (not shown) for rotating the disc. The sub-code data is applied to a system controller 18.

The system controller 18, comprising a microcomputer, controls the entire system including the servo controller 15 according to the instructions provided through a keyboard 19 and the sub-code data from the RF reproducing circuit 16, and controls the operation of a display unit 20, and the operation of a loading mechanism 21 which operates to load and unload a disc.

One example of a processing procedure which is carried out by a processor in the servo controller 15 to control the gains of the VCA 10 and the digital EQ 13 will be described with reference to a flow chart shown in FIG. 2.

In the tracking servo system, the servo loop is opened at the start of the system, or in a search or track jump mode. First, the processor determines whether the servo loop is open or closed (Step S1). When the servo loop is open, the gain $G_A$ of the VCA 10 is set to a predetermined value $G_1$, while the gain $G_B$ of the digital equalizer 13 is set to a predetermined value $G_2$ (Step S2). The value $G_1$ has been so determined that the tracking error signal amplified with the gain $G_1$ can effectively use the bits in the A/D converter 12.

On the other hand, in the ordinary play mode, the servo loop is closed. Upon detection of the closure of the loop (Step S3), the processor sets the gain $G_A$ of the VCA 10 to a value $NG_1$ (N =5 for instance) and the gain GB of the digital equalizer 13 to 1/N of the value $G_2$ (Step S4). The value N is determined from the difference in level between the error signal provided when the loop is closed and that provided when the loop is open, and it is so selected that the error signal level multiplied by the factor N in the case where the servo loop is closed is equal to the error signal level provided when the servo loop is open. The multiplication of the gain $G_B$ of the digital equalizer 13 by 1/N is to make the total gain in the case where the servo loop is closed substantially equal to that in the case where the servo loop is open.

As was described above, in the case where the servo loop is closed, the gain of the VCA 10 is increased (N times) by a predetermined value while the gain of the digital equalizer 13 is decreased (1/N- times) by a predetermined value, when compared with those in the case where the servo loop is open. Therefore, whether the servo loop is open or closed, the bits of the A/D converter 12 can be effectively utilized, and accordingly the digital servo can be achieved with high accuracy.

The gain control of the VCA 10 and the digital equalizer 13 carried out by the processor in the servo controller 15 can be achieved also according to a flow chart shown in FIG. 3.

As shown in FIG. 3, the servo loop is opened or closed (Step S11). As was described before, in the tracking servo system, the servo loop is open at the start of the system or in a search or track jump mode, and it is closed in the ordinary play mode. The processor determines whether the servo loop is open or closed (Step S12). When it is open, the processor sets the gain $G_A$ of the VCA 10 to a predetermined value $G_1$ and the gain $G_B$ of the digital equalizer 13 to a predetermined value $G_2$ (Step S13). When, on the other hand, the servo loop is closed, the gain $G_A$ of the VCA 10 is set to a value N times that $G_1$ provided when the servo loop is open, and the gain $G_B$ of the digital equalizer 13 is set to a value 1/N times that $G_2$ (Step S14).

In the above-described embodiment, in the servo system using the PWM circuit 14 to drive the actuator according to the pulse width, the gain of the digital equalizer 13 is made 1/N times. The technical concept of the invention is applicable to a servo system in which the actuator is driven according to the level of the error signal which is subjected to frequency characteristic compensation by the digital equalizer 13 and then to digital-to-analog conversion by the D/A (digital-to-analog) converter. In this case, it goes without saying that, instead of the gain of the digital equalizer 13, the gain of the D/A converter may be made 1/N times.

In the above-described embodiment, the VCAs are employed as the variable gain amplifiers: however, it is possible to use current-controlled amplifiers instead of the VCAs. In this case, current-to-voltage conversion is effected in the front stage of the MPX 11.

Furthermore, in the above-described embodiment, the technical concept of the invention is applied to the tracking servo system: however, it may be applied to the focus servo system in such a manner that the gain of the VCA 9 is controlled.

As was described above, in the servo device according to the invention, when the servo loop is closed the gain of the variable gain amplifier is increased by a predetermined value when compared with that provided when the servo loop is open, and the gain of the signal processing system on the output side of the A/D converter is decreased by a predetermined value when compared with that provided when the servo loop is open. Therefore, whether the servo loop is open or closed, the bits of the A/D converter can be utilized effectively, and the digital servo can perform with high accuracy.

What is claimed is:

1. In a disc player servo device of the type having an A/D converter for digitizing analog error signals formed from an output signal of a pickup adapted to read record data from a data record disc. and means for driving said pickup according to the level of said error signal, the improvement comprising:

a variable gain amplifier provided on the input side of said A/D converter for amplifying said error signals and supplying said amplified error signals to said A/D converter; digital signal variable amplification means connected to receive the digitized output signals from said A/D converter, and control means connected to said variable gain amplifier, and said amplification means and responsive to the open/closed loop condition of said servo for controlling the amplification factors of said amplifier and amplification means to achieve substantially equal overall gain for both open loop and closed loop error signals while greatly increasing the voltage range of said closed loop error signals input to said A/D converter.

2. A servo device as claimed in claim 1, wherein said control means controls the amplification factor of said amplifier so that it has a gain of $G_1$ when the servo loop is open and a gain of $NG_1$ when the servo loop is closed, and where $N > 1$.

3. A servo device as claimed in claim 2, wherein said control means controls the amplification factor of said amplification means so that it has a gain of $G_2$ when the servo loop is open and a gain of $G_2/N$. when the servo loop is closed.

4. A servo device as claimed in claim 3, wherein said control means comprises a microcomputer.

5. A servo device as claimed in claim 4, wherein said amplification means is a digital equalizer for compensating the frequency characteristic of said error signal.

* * * * *